United States Patent
Valentine et al.

(10) Patent No.: US 11,752,561 B2
(45) Date of Patent: Sep. 12, 2023

(54) APPARATUS, SYSTEMS, AND METHODS FOR ENGINE DOWEL INSTALLATION

(71) Applicant: BNSF Railway Company, Fort Worth, TX (US)

(72) Inventors: Larry C. Valentine, Berryton, KS (US); Ryan L. Kimberlin, Meriden, KS (US); Mike E. Teaford, Topeka, KS (US)

(73) Assignee: BNSF Railway Company, Fort Worth, TX (US)

( * ) Notice: Subject to any disclaimer, the term of this patent is extended or adjusted under 35 U.S.C. 154(b) by 0 days.

(21) Appl. No.: 17/203,019

(22) Filed: Mar. 16, 2021

(65) Prior Publication Data

US 2022/0297203 A1 Sep. 22, 2022

(51) Int. Cl.
*B23B 47/28* (2006.01)
*B23B 41/12* (2006.01)

(52) U.S. Cl.
CPC ............ *B23B 47/288* (2013.01); *B23B 41/12* (2013.01); *B23B 2215/24* (2013.01); *B23B 2247/12* (2013.01)

(58) Field of Classification Search
CPC ..... B23B 47/28; B23B 47/287; B23B 47/288; B23B 2247/12; B23B 2247/00; B23B 41/12; B23B 2213/24; Y10T 408/567; Y10T 408/568
See application file for complete search history.

(56) References Cited

U.S. PATENT DOCUMENTS

| | | | | |
|---|---|---|---|---|
| 668,695 | A * | 2/1901 | Stevens | B23B 47/288 144/92 |
| 1,430,895 | A * | 10/1922 | Fetterly | B23B 47/281 408/98 |
| 1,445,016 | A * | 2/1923 | Golembiewski | B23B 47/28 269/289 R |
| 2,810,310 | A * | 10/1957 | Saunders | B23B 47/288 408/109 |
| 3,708,237 | A * | 1/1973 | Kruse | B23B 47/288 408/108 |

(Continued)

FOREIGN PATENT DOCUMENTS

| | | |
|---|---|---|
| CN | 201439131 U | 4/2010 |
| CN | 102950313 A | 3/2013 |

(Continued)

*Primary Examiner* — Eric A. Gates
(74) *Attorney, Agent, or Firm* — Whitaker, Chalk, Swindle & Schwartz PLLC; Enrique Sanchez, Jr.

(57) ABSTRACT

A drill jig apparatus configured to be coupled to a locomotive bedplate is presented. The apparatus can include a first member and a second member. The first member can be configured to attach a drill to provide stability while drilling, and the second member can be operably coupled to a locomotive, such as to an engine and bedplate of a locomotive. An engine dowel drilling system is also presented, which can include a drill jig member and a bushing member, and the members can be operably coupled with one another. A method of drilling holes in a locomotive bedplate can include using a drill jig and a bushing to facilitate drilling, and the drill jig can be a conductor-side jig or an engineer-side jig. A kit is also presented for engine dowel installation that can standardize dowels and dowel holes.

16 Claims, 10 Drawing Sheets

(56) References Cited

U.S. PATENT DOCUMENTS

| | | | | |
|---|---|---|---|---|
| 4,332,514 | A * | 6/1982 | Dergo | B23B 47/288 408/103 |
| 4,377,357 | A * | 3/1983 | Butera | B23B 47/288 408/115 R |
| 4,448,572 | A * | 5/1984 | Gill | B23B 47/287 408/115 R |
| 4,521,140 | A * | 6/1985 | Doescher | B23B 47/287 408/108 |
| 4,594,032 | A * | 6/1986 | Warburg | B23B 47/288 408/115 R |
| 4,669,926 | A * | 6/1987 | Wilcox, Jr. | B23B 47/281 269/87.3 |
| 4,884,926 | A * | 12/1989 | Gibson | B23B 47/288 408/115 R |
| 5,230,592 | A * | 7/1993 | Degen | B23B 47/288 408/241 B |
| 5,782,006 | A * | 7/1998 | Erway | B23B 47/288 33/644 |
| 6,244,795 | B1 | 6/2001 | Fenelon | |
| 7,229,237 | B1 * | 6/2007 | Fulgham | B23B 47/284 408/115 R |
| 11,383,308 | B2 * | 7/2022 | Cammack | B23B 47/288 |
| 2003/0170082 | A1 * | 9/2003 | Garcia | B23B 47/28 408/67 |
| 2006/0233620 | A1 * | 10/2006 | Herrick | B23B 47/288 408/115 R |
| 2006/0285931 | A1 * | 12/2006 | Dean | B23B 47/287 408/103 |
| 2010/0070117 | A1 * | 3/2010 | Siffert | B61C 15/08 701/19 |
| 2020/0094690 | A1 * | 3/2020 | Sondur | B61C 17/06 |
| 2021/0362246 | A1 * | 11/2021 | Cammack | B23B 47/287 |

FOREIGN PATENT DOCUMENTS

| | | | | |
|---|---|---|---|---|
| CN | 202963553 | U | 6/2013 | |
| CN | 203711934 | U | 7/2014 | |
| CN | 204430360 | U | 7/2015 | |
| DE | 3020970 | A1 * | 12/1981 | |
| DE | 29815702 | U1 * | 1/2000 | B23B 47/288 |
| EP | 0061022 | A2 | 9/1982 | |
| GB | 661420 | A * | 11/1951 | B23B 47/281 |

* cited by examiner

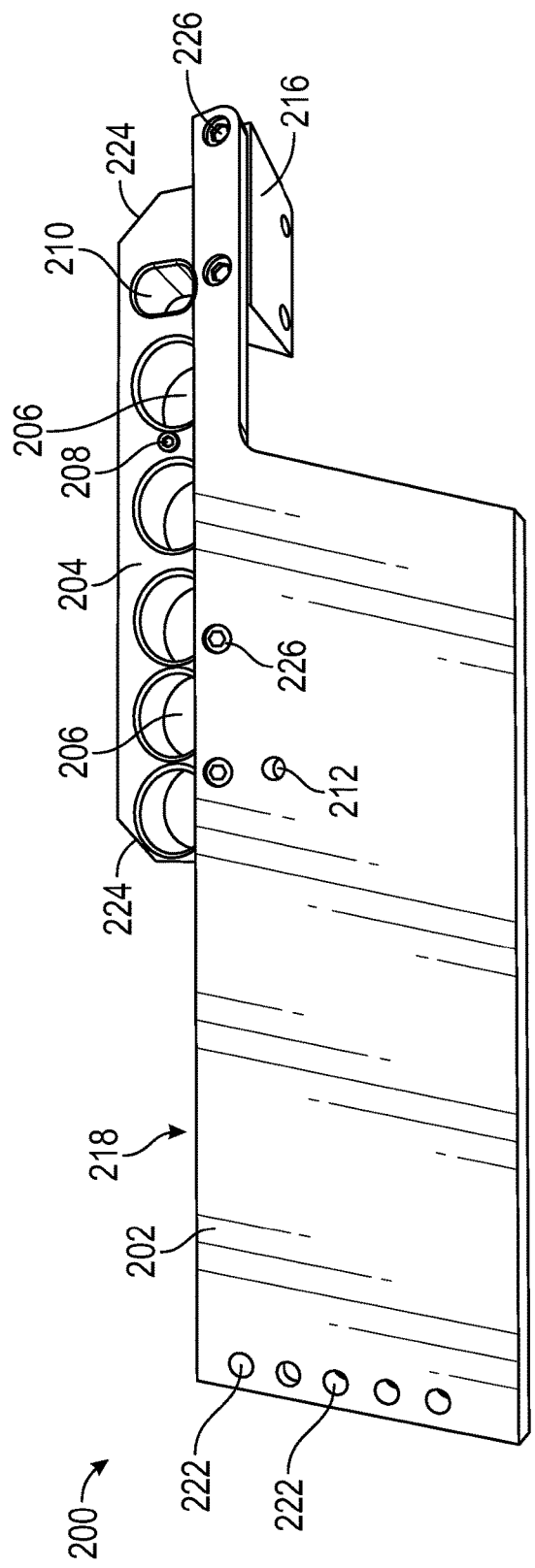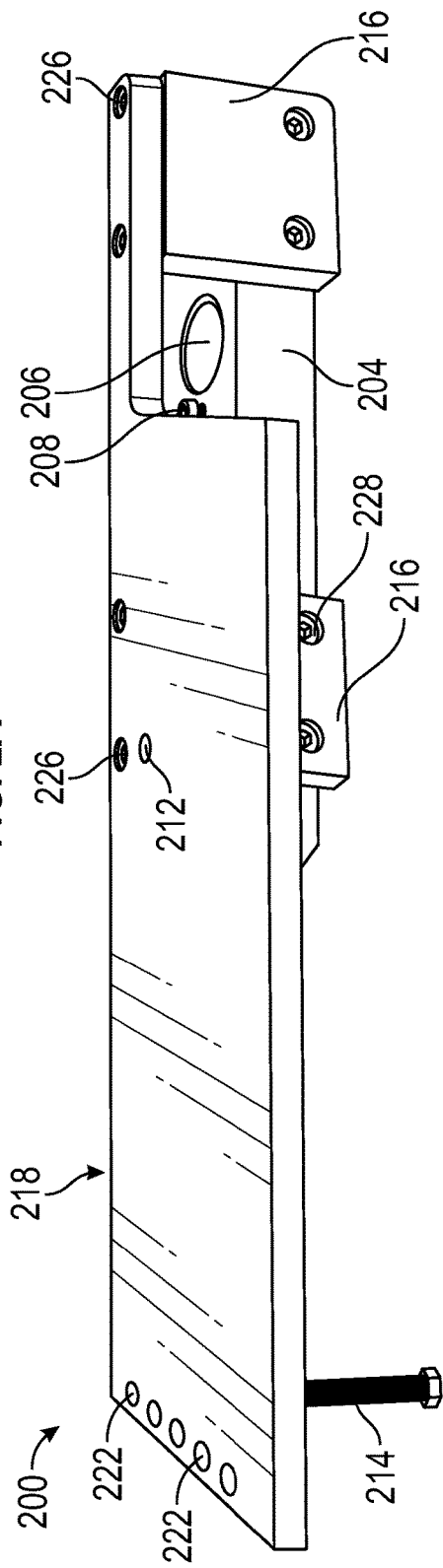
FIG. 2A
FIG. 2B

APPARATUS, SYSTEMS, AND METHODS FOR ENGINE DOWEL INSTALLATION

TECHNICAL FIELD

The present disclosure relates generally to apparatuses, systems, and methods for using jigs and drilling systems to fabricate holes, such as dowel holes. Specifically, in one embodiment, the present disclosure can be related to jigs and systems for creating dowel holes for locomotive engines.

BACKGROUND

Trains of all types require crews to operate. Typically, two crew members are required to operate any locomotive: the engineer and the conductor. In general, the engineer is the "driver" of the train and is directly in charge of its mechanical operation. Symbiotically, the conductor plays a supervisory role over the entire operation, communicating instructions and keeping informed of delays and other important information. The engineer and conductor are usually located in the front car (e.g., locomotive) of the train, which houses the engine. In the United States, the engineer is located on the right side of the front car, and the conductor on the left side. The train components located on these separate sides of the locomotive can be characteristic of the specific sides, such that, for example, a conductor side of one diesel locomotive can be similar to a conductor side of another diesel locomotive.

The engine of the train is gargantuan, designed to generate enough power to haul thousands, even tens of thousands, of tons. Maintaining correct alignment of the engine with other train components (e.g., the alternator) is of paramount importance; if misalignment occurs, the results can be catastrophic, leading to, for example, total engine failure. Because of the sheer size of the engine and necessity that it remain unmoved, the engine is usually mounted to a locomotive bedplate, which is commonly a one-piece steel casting providing structural integrity to the locomotive. Engines can be mounted to a locomotive bed plate via bolts, such as engine mounting bolts, which can directly engage the bedplate and engine, facilitating nearly immovable attachment of the engine to the locomotive bedplate. In some types of locomotives, while the engine can be mounted to the bedplate with engine mounting bolts, dowels can additionally be used to minimize movement of the engine in transit. For example, in some electro-motive diesel (EMD) trains, the front and back of the locomotive can be designed to accommodate thermal expansion and compression, meaning that slight movements of the engine along the longitudinal axis of the locomotive can be expected and accounted for with respect to maintaining component alignment. On the other hand, movement of the engine toward the generator (e.g., along a lateral axis of locomotive) or shift from side-to-side can lead to disastrous misalignment. Therefore, in EMD locomotives, dowels are often used to increase the integrity of the engine-bedplate coupling, such as with respect to restricting movement along a lateral axis.

While dowels provide a simple and effective way to mitigate or prevent unwanted engine movement, there are several issues that accompany such practice. For example, as the train is utilized, the engine can wear on the dowel and hole in which it sits, wallowing out the hole and causing the dowel to become loose. In such instances, the dowels have to be replaced; the old holes usually have to be welded solid, which may require removal of the engine from the locomotive, and new holes have to be drilled. Dowel fabrication and installation can also be a daunting task—the engine and bedplate are usually made of solid steel and creating inches-deep holes through these components can be extremely unsafe and time-consuming with almost no conformity. For example, a drill could catch on an inconsistency in the metal and "walk" on the operator, potentially leading to grievous injury. This problem is exacerbated by where the drilling must occur (e.g., the side of an engine on the locomotive bedplate), because finding a stable location to rest the drill during operation is extremely difficult. Various components (such as electrical junction boxes, fluid lines or pipes, electrical wiring, etc.) can be disposed between the drill operator and the engine/bedplate into which he or she is drilling. Further, standardizing dowel and dowel hole diameters to industrialize the manufacturing/drilling processes is arduous in itself—because each shop trained to perform dowel fabrication and/or dowel hole drilling can follow different practices and procedures in the processes, extremely significant differences can exist between dowels and dowel holes from shop to shop. As a result, dowel holes and accompanying dowels often have to be tailor-made for each other, requiring significant time and expense.

SUMMARY

The present disclosure offers several advantages in the art. For example, the disclosure can provide for the standardization of dowel fabrication and dowel hole drilling, greatly increasing the efficiency in which these tasks are performed. In another example, the present disclosure can provide a drill jig that can support a drill, such that the drill can be stabilized by the drill jig as drilling occurs, which enhances safety and efficiency of the drilling process. In another embodiment, the present disclosure can include drill jigs configured to correspond to discrete sides of a locomotive, such as the engineer and conductor sides. In another embodiment, the welding of existing dowel holes (such as during dowel replacement) can be avoided by providing multiple locations in which a dowel hole can be created using the systems, methods, and apparatuses presented herein. In another embodiment, standardization of dowel fabrication and dowel hole drilling can be accomplished via a kit containing components configured to facilitate such standardization, the kit can include standardized jigs, bushings, and dowels.

In one embodiment, the present disclosure can include a drill jig apparatus. The apparatus can include a first member, a second member, and a third member. The first member can include a jacking bolt hole configured to receive a jacking bolt. The second member can include a first opening configured to receive a bushing, and a jig bolt hole configured to receive a jig bolt. The third member can be coupled to the first and second members. Wherein the apparatus can be operably coupled to engage a conductor side of a locomotive. Wherein the apparatus can be operably coupled to an engineer side of a locomotive. Wherein the jacking bolt can be operable to vertically adjust within the first member. Wherein the second member can further include a bushing pin. Wherein the second member can be disposed below the first member. Wherein the second member can include a second opening. Wherein the first member can be operably coupled to a drill. The apparatus can further include a lifting eye.

In another embodiment, the present disclosure can include an engine dowel drilling system. The system can include a drill jig member and a bushing member. The drill jig member can include a first member including a jacking bolt, and a second member including at least one dowel opening and at least one jig bolt opening. The second member can be operably coupled to the bushing member. Wherein the drill jig member can be configured to couple to an engine over an engine mounting bolt. Wherein the drill jig member can be configured to operably couple to a drill. Wherein the drill jig member can further include a bushing pin. Wherein the first member can be removably coupled to the second member. Wherein the drill jig member can further include a third member coupled to the first and second members. Wherein the drill jig member can be operably coupled to an engineer side or a conductor side of an engine.

In another embodiment, the present disclosure can include a method of fabricating holes in a locomotive engine base. The method can include the steps of coupling a drill jig to a locomotive car body engine base; engaging a bushing with the opening; and drilling a hole in the engine base. The drill jig can further include the step of adjusting a jacking bolt operably coupled to the first member to stabilize the drill jig against a surface. The drill jig can further include the step of identifying a drilling area within at least one opening. Wherein the drill jig can be coupled to the engine base with a jig bolt.

In another embodiment, the present disclosure can include a dowel hole drilling kit. The kit can include: a first drill bit; a first bushing corresponding to the first drill bit; a dowel; an engineer-side jig; and a conductor-side jig.

BRIEF DESCRIPTION OF THE DRAWINGS

The present disclosure will be readily understood by the following detailed description, taken in conjunction with the accompanying drawings that illustrate, by way of example, the principles of the present disclosure. The drawings illustrate the design and utility of one or more exemplary embodiments of the present disclosure, in which like elements are referred to by like reference numbers or symbols. The objects and elements in the drawings are not necessarily drawn to scale, proportion, or precise positional relationship. Instead, emphasis is focused on illustrating the principles of the present disclosure.

FIG. 2A illustrates a perspective view of a drill jig that can include a first and second member, in accordance with one or more exemplary embodiments of the present disclosure;

FIG. 2B illustrates a perspective view of a drill jig that can include first, second, and third members, in accordance with one or more exemplary embodiments of the present disclosure;

DETAILED DESCRIPTION

Figure 1A:
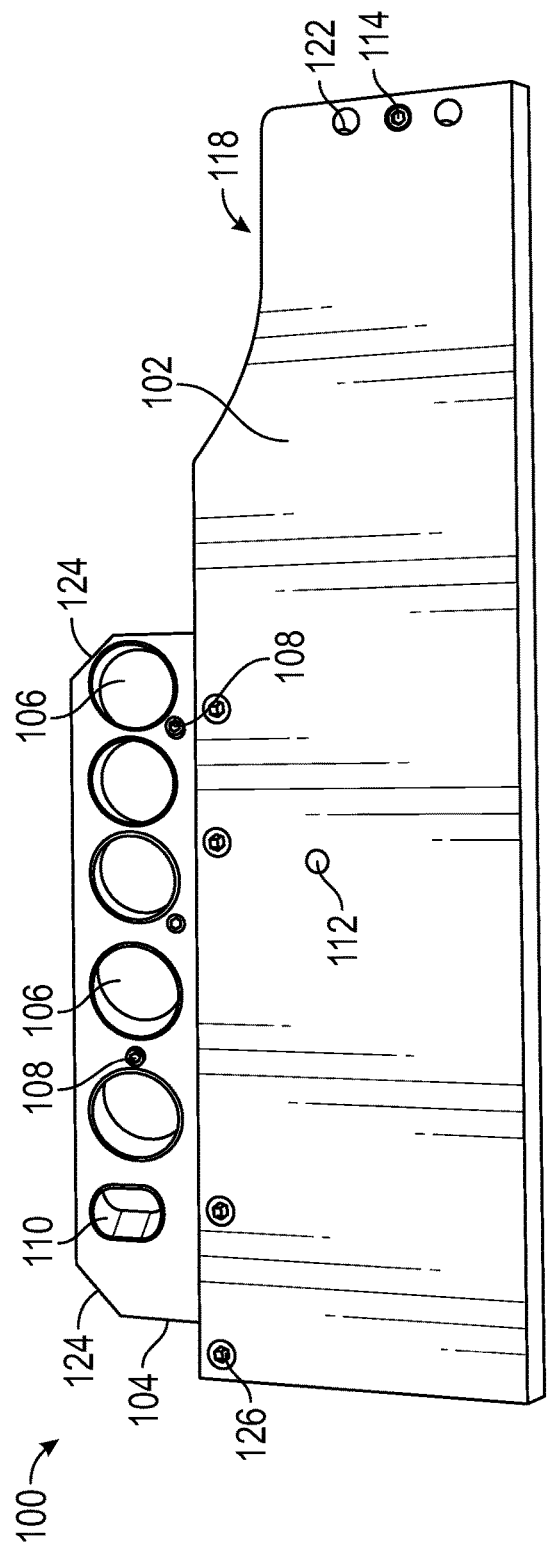
FIG. 1A illustrates a perspective view of a drill jig that can include a first and second member, in accordance with one or more exemplary embodiments of the present disclosure.
Figure 1B:
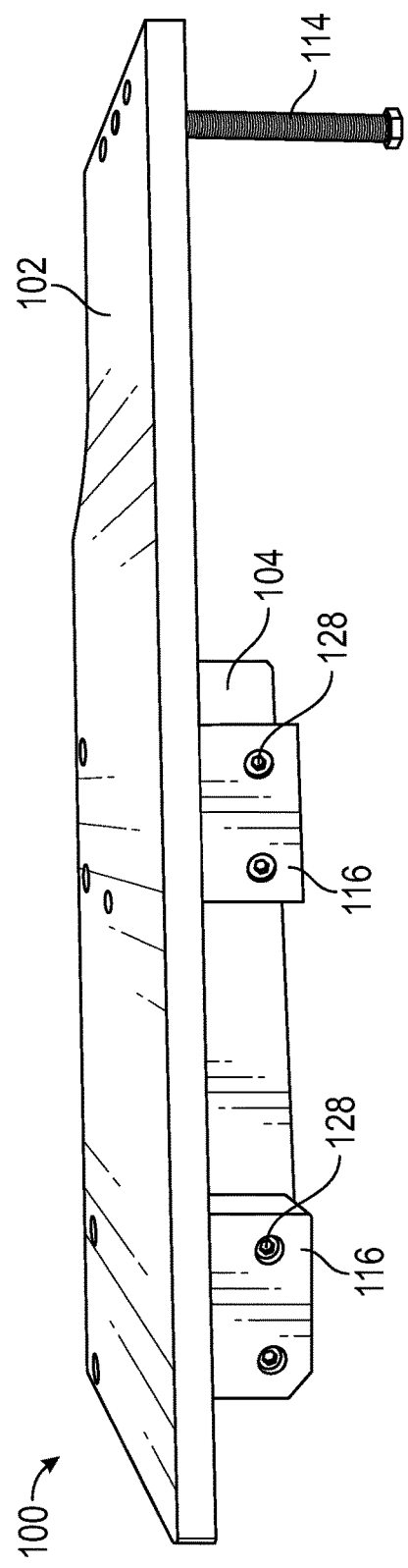
FIG. 1B illustrates a perspective view of a drill jig that can include first, second, and third members, in accordance with one or more exemplary embodiments of the present disclosure.
Figure 1C:
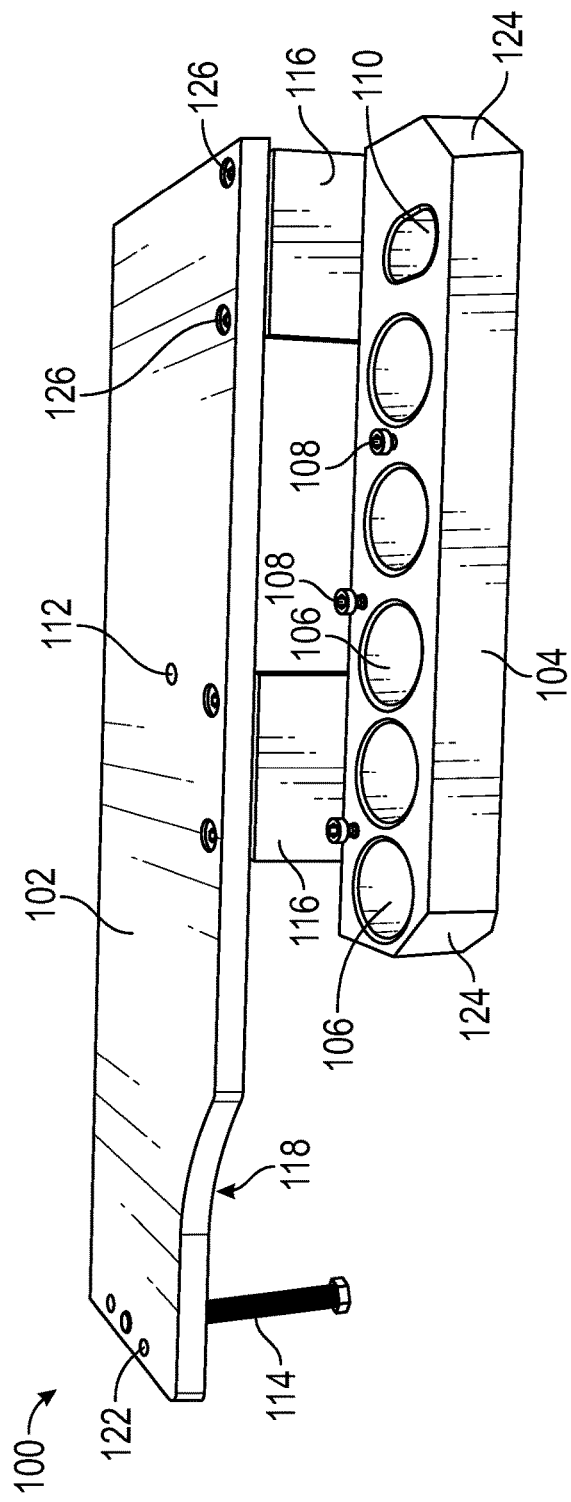
FIG. 1C illustrates a perspective view of a drill jig that can be operably coupled to a conductor side of an engine, in accordance with one or more exemplary embodiments of the present disclosure.
Figure 1D:
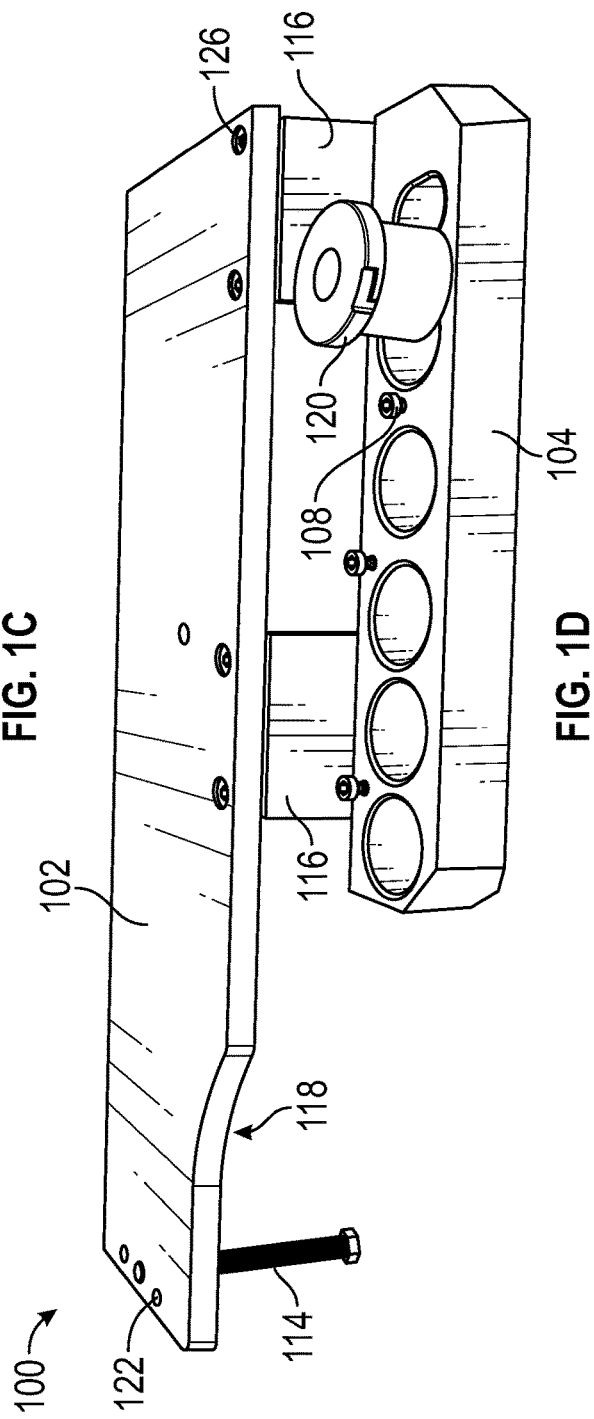
FIG. 1D illustrates a perspective view of a drill jig system that can include a jig apparatus and bushing, in accordance with one or more exemplary embodiments of the present disclosure.
Figure 2C:
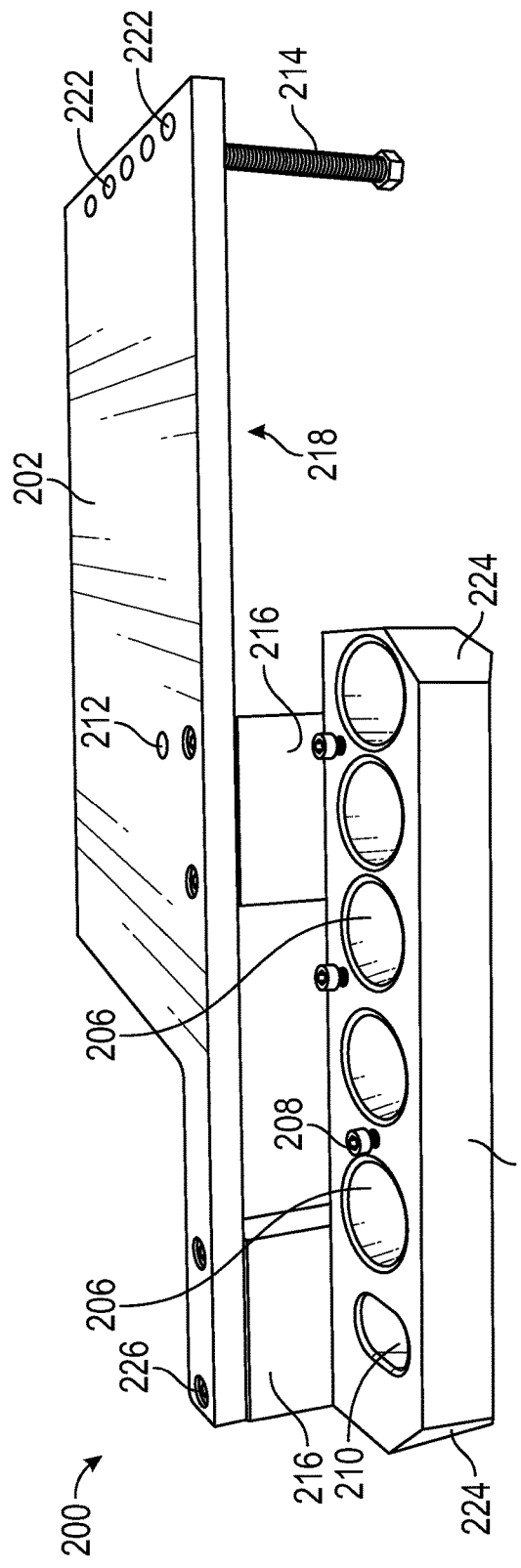
FIG. 2C illustrates a perspective view of a drill jig that can be operably coupled to an engineer side of an engine, in accordance with one or more exemplary embodiments of the present disclosure.
Figure 2D:
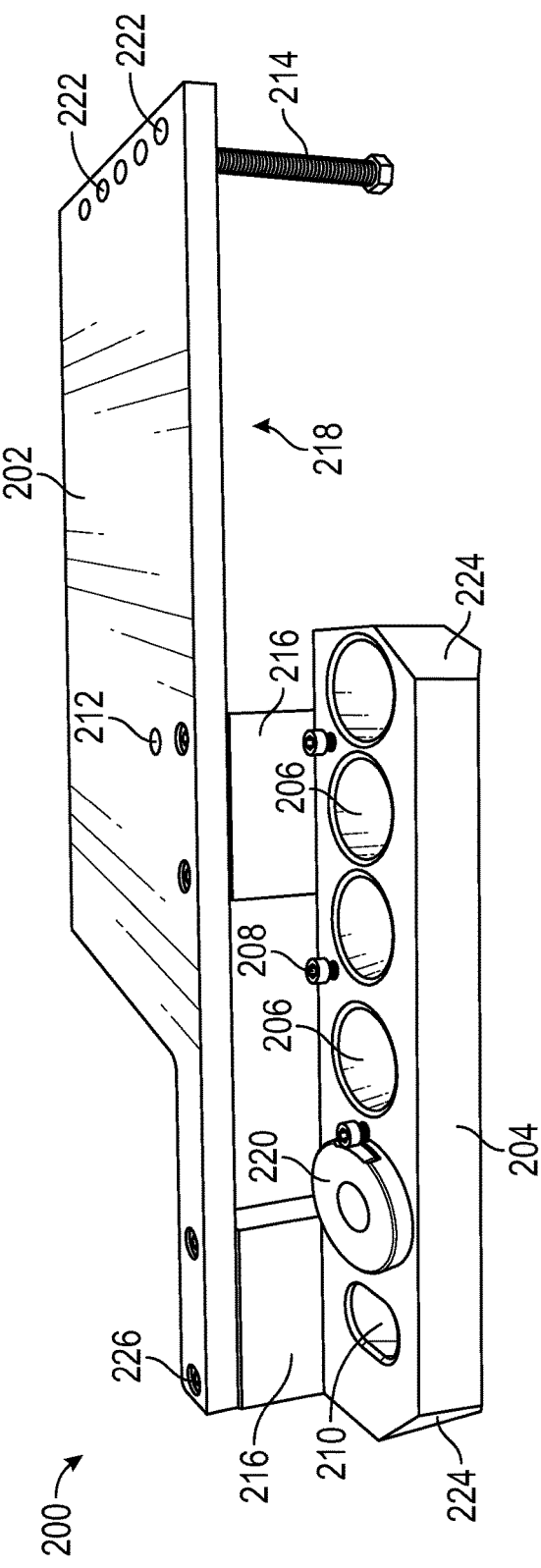
FIG. 2D illustrates a perspective view of a drill jig system that can include a jig member and a bushing member operably coupled to the jig member, in accordance with one or more exemplary embodiments of the present disclosure.

The preferred version of the disclosure presented in the following written description and the various features and advantageous details thereof, are explained more fully with reference to the non-limiting examples included in the accompanying drawings and as detailed in the description, which follows. Descriptions of well-known components have been omitted so to not unnecessarily obscure the principal features described herein. The examples used in the following description are intended to facilitate an understanding of the ways in which the disclosure can be implemented and practiced. Accordingly, these examples should not be construed as limiting the scope of the claims.

FIGS. 1A-1D illustrate perspective views of an engine dowel drill jig apparatus 100 in accordance with the principles of the present disclosure. In one embodiment, the apparatus 100 can include a first member 102 and a second member 104. In another embodiment, the first member 102 can include one or more bolt holes (jacking bolt holes) 122 configured to receive a jacking bolt 114. For example, the bolt hole 122 can include threads that can correspond to threads on the jacking bolt 114; in another embodiment, the bolt holes 122 can include any suitable coupling mechanism operable to correspond to a coupling mechanism found on a jacking bolt 114 (or suitable to couple to a jacking bolt 114), such that the jacking bolt 114 can be in operable connection with the first member 102. For example, the jacking bolt 114 can be engaged with a jacking bolt hole 122 of the first member 102 via threads of the bolt 114 and hole 122; applying torque to the bolt 114 (or first member 122) can cause the jacking bolt 114 to travel vertically within the jacking bolt hole 122. In this manner, the apparatus 100 or first member 102 can be operable to adaptably stabilize against a surface underneath the apparatus 100 or first member 102 by varying the extent to which the jacking bolt 114 protrudes from the first member 102. In another embodiment, the jacking bolt 114 can be operably coupled to any of the bolt holes 122 of the first member 102, such that topographical deviations in the horizontal plane of an underlying surface can be further accounted for. For example, the bolt 114 can be moved to a hole 122 closer to or farther from the second member 104 to facilitate improved positioning for drilling stability. In another embodiment, the first member 102 can further include a lifting eye hole 112 (an example of a lifting eye can be seen in FIGS. 4A-4B). For example the hole 112 can be configured to facilitate coupling of the apparatus 100 with a lifting eye, such that the lifting eye can be utilized to hoist the apparatus 100. In another embodiment, the hole 112 can be located near a center of mass of the apparatus 100.

In one embodiment, the second member 104 can include a jig bolt hole 110 that can be configured to receive a jig bolt (not shown in FIG. 1A). For example, a jig bolt hole 110 can be sized to receive a jig bolt, such as to facilitate coupling of the apparatus 100 to, e.g., a bedplate and/or and engine plate or engine. In another embodiment, a jib bolt hole 110 can be oblong, such that a hole below the bolt hole 110 can accessed at multiple points within the hole 110. In another embodiment, the jig bolt hole 110 can be operable to overlay an engine mounting bolt hole; for example, an oblong jig bolt hole 110 can accommodate deviations in the location of an engine mounting bolt hole from engine to engine by nature of being oblong, such that an engine mounting bolt hole can be accessed through the jig bolt hole 110 at any point in the bolt hole 110. In one embodiment, the second member 104 can include one or more dowel holes (dowel openings) 106 that can be configured to, for example, receive and engage a bushing 120. For example, the dowel hole 106 can be of a predetermined diameter such that a bushing 120 can insert into the hole 106, such that the bushing 120 can be engaged within the hole 106. In another embodiment, the second member 104 can include one or more pins (bushing pins) 108 configured to engage a bushing 120. In one example, a pin 108 can abut a bushing 120 such that when torque is applied to or within the bushing 120 cavity (e.g., when a drill is rotating within a bushing 120), the bushing 120 can be secured in place by the pin 108. In another example, the pin 108 can be configured to engage a notch in a bushing 120, such that rotation movement of the bushing 120 can be restricted.

In another example, the first member 102 can be coupled with the second member 104. For example, the apparatus 100 can include a third member 116 that can operably couple the first member 102 with the second member 104. In one embodiment, a screw 126 or rivet 126 can securely attached the first member 102 to the third member 116; in another embodiment, a screw 128 or rivet 128 can securely attach the second member 104 to the third member 116. In one embodiment, the third member 116 can have two constituents, such as can be seen in FIGS. 1A-1D; in another embodiment, the third member 116 can be continuous piece. In another embodiment, the first member 102 can be directly coupled to the second member 104, such as without the third member 116. In another embodiment, the apparatus 100 can be considered as a single member with a first constituent 102 and second constituent 104, and in some embodiments, a third constituent 116. In another embodiment, the third member 116 can be two blocks 116 operable to couple to the first and second members 102, 104. In another embodiment, the third member can be a single block facilitating such coupling. In another embodiment, the third member 116 can be one or more stanchions 116 or columns 116 operable to couple to the first and second member 102, 104 and maintain the first member 102 in a position above the second member 104.

In one embodiment, the apparatus 100 can be configured to engage a bedplate or engine of a locomotive. For example, the first member 102 can include a notch 118 or rounded notch 118 that can facilitate the coupling of the apparatus 100 around a locomotive component, such as a pipe, conduit box, or any other component. In another example, the first member 102 can have a hole, slant, or any other design or configuration suitable to allow the apparatus 100 to couple to a car body around a train component. In another embodiment, the second member 104 can include a chamfered corner 124 or chamfered corners 124 that can facilitate the engagement of the second member 104 and apparatus 100 with an engine, an example of which can be seen in FIG. 5B. In another example, the first member 102 can be a platform 102 adapted to facilitate placement of a drill thereon, such as a mag drill known in the art. In another embodiment, the first member 102 can be a rectangle, rhombus, circle, or any other shape suitable to provide a rest for a drill. In one embodiment, the apparatus 100 can have two platforms 102, 104, the first platform 102 disposed above the second platform 104. In another embodiment, the first platform 102 can be configured to receive a drill, such as to facilitate the resting of a drill during drilling, and the second platform 104 can be configured to engage a rail car and/or engine and/or bedplate, such as by having chamfered corners 124, being of a pre-determined length, width, and thickness, etc.

Preferably, the apparatus 100 can be configured to engage a locomotive on the conductor side of the locomotive; for example, the apparatus 100 can be a conductor-side jig 100. For example, the apparatus 100 can be configured to enable orientation of the apparatus 100 such that the second member 104 can contact a locomotive with the first member 102 extending therefrom, and a longitudinal axis of the first member 102 can be substantially parallel with a longitudinal axis of a locomotive (and substantially perpendicular to a lateral axis of the locomotive). In another embodiment, the first member 102 can be configured to accommodate locomotive components generally found on a conductor side of a locomotive. For example, the first member 102 can include an indentation 118 on a side of the first member 102, such that the apparatus 100 can abut the locomotive around a locomotive component when the apparatus 100 is coupled to the locomotive via, e.g., a jig bolt. In another embodiment, the second member 104 can include chamfers 124 that can correspond to edges or corners found on an engine or a component mounted thereto on a conductor side of a locomotive.

FIGS. 2A-2D illustrate perspective views of a drill jig apparatus 200 in accordance with the principles of the present disclosure. In one embodiment, the apparatus 200 can be similar to apparatus 100. For example, the apparatus 200 can include a first member 202, second member 204, and a third member 216. In one embodiment, the first member 202 can include a jacking bolt 214 operable to engage within jacking bolt holes 222. In another embodiment, the second member 204 can include dowel openings (openings) 206 and a jig bolt hole 210, as well as bushing pins 208. In another embodiment, the apparatus 200 can further include a third member 216 coupled to the first member 202 via any suitable mechanism, such as welding, screws, adhesive, or any other method suitable to attach the first member 202 to the third member 216; in one embodiment, the first member 202 can be coupled to the third member 216 via screws 226 or rivets 226. In another embodiment, the third member 216 can be coupled to the second member 204 via any suitable mechanism, similar to a coupling between the third member 216 and the first member 202; in one embodiment, the third and second member 216, 204 can be coupled via screws 228 or rivets 228. In another embodiment, the first and second members 202, 204 can be coupled to each other via welding, screws, adhesive, or any other method suitable to dispose the first member 202 above the second member 204. In another embodiment, the second member 204 can include chamfers 224, such as to facilitate engaging of the apparatus 200 with a locomotive or an engine of a locomotive. Preferably, the members 202, 204, and 216 can be removable coupled with one another, such that if a member is damaged, the member can be replaced on the apparatus 200.

In another embodiment, the dowel openings 206 can be configured to receive a bushing 220. For example, a dowel opening 206 can be of a pre-determined diameter; such that a bushing 220 can be inserted into the opening 206. In one embodiment, the bushing 220 can engage within the open- ings) 206 of the second member 204. For example, an outer diameter of the bushing 220 can be similar to an inner diameter of an opening 206, such that the bushing 220 can be snugly fitted within the opening 206, such as to restrict unwanted rotational movement of the bushing 220. In another example, the second member can include bushing pins 208 or screws 208 configured to engage a bushing 220. For example, the pins 208 can have a head sized to match a notch on a bushing 220, such that rotational movement can be restricted by the bushing pin 208. Preferably, the appa- ratus 200 can have five dowel openings 206. In another embodiment, the apparatus 200 can have three busing pins 208. In one embodiment, the second member 204 can have five openings 206 and three pins 208, and the pins 208 can be located strategically such that a bushing 220 located within any one of the openings 206 can have a pin 208 available to engage. In another embodiment, the apparatus 200 can include any number or combination of openings 206 and pins 208, such that any bushing engaged with the apparatus 200 can be engaged with a pin 208.

Preferably, the apparatus 200 can be configured to engage a locomotive on an engineer side; for example, the apparatus 200 can be an engineer-side jig 200. For example, the apparatus 200 can be configured to enable orientation of the apparatus 200 such that the second member 204 can contact a locomotive with the first member 202 extending there- from, and a longitudinal axis of the first member 202 can be substantially parallel with a longitudinal axis of a locomo- tive (and substantially perpendicular to a lateral axis of the locomotive). In another embodiment, the first member 202 can be configured to accommodate locomotive or train components generally found on an engineer side of a loco- motive. For example, the first member 202 can be a raised platform operable to cover a locomotive component and provide a platform on which to set a mag drill. In another example, the first member 202 can include multiple jacking bolt holes 222 each capable of receiving a jacking bolt 214, such that the jacking bolt 214 placement can be customized to accommodate a surface extending thereunder. In another embodiment, the second member 204 can include chamfers 224 that can correspond to edges or corners found on an engine or bedplate or a component mounted thereto on an engineer side of a locomotive. In one embodiment, the first member 202 can include a straight edge 218 that can, for example, maximize the surface area of the first member 202 to facilitate the coupling of a drill thereto, such as over a locomotive component.

Figure 3A:
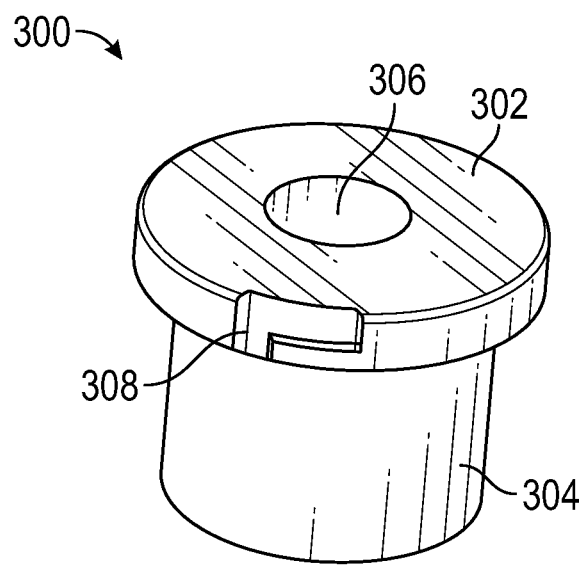
FIG. 3A illustrates a bushing member that can include a notch, in accordance with one or more exemplary embodiments of the present disclosure.

FIG. 3A depicts bushing member (bushing) 300 in accor- dance with the principles of the present disclosure. A bush- ing member 300 can be a headless wearing slip-fit bushing, a head wearing slip-fit bushing, a headless liner bushing with renewable bushing, a head liner bushing with renewable bushing, a lock renewable bushing, or any other type of bushing suitable to engage with a jig apparatus (such as those described in FIGS. 1A-1D and 2A-2D) and facilitate the guiding of a drill. Preferably, the bushing member 300 can include a head 302 and a body 304. In one embodiment, the bushing member 300 can include a cavity 306 or drill cavity 306. In another embodiment, the cavity 306 can be configured to accept a drill bit of a mag drill to drill a dowel hole. In another embodiment, the bushing member 300 can be configured to engage a jig apparatus in accordance with the principles of the present disclosure. For example, the bushing member 300 can include a notch 308 on the head 302 of the bushing 300, such as a notch 308 that can engage a bushing pin (like that discussed with respect to FIGS. 1A-1D and 2A-2D). In another example, the diameter of the body 304 can be sized such that it can snugly engage a dowel opening of a drill jig apparatus. In another example, the bushing 300 can include corrugations on an underside of the head 302 that can correspond to corrugations found on a drill jig apparatus. In another example, the body 304 can include embossing configured to engage with indentions found within a dowel opening.

Figure 3B:
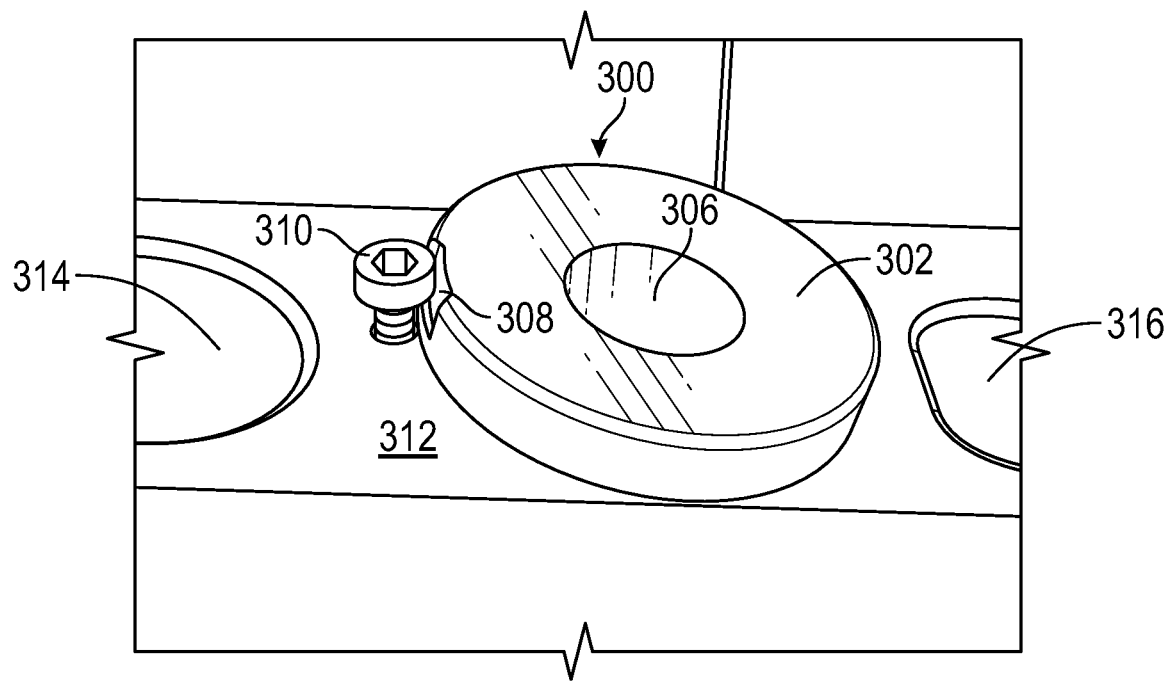
FIG. 3B illustrates a bushing member operably coupled to a bushing pin of a jig, in accordance with one or more exemplary embodiments of the present disclosure.

FIG. 3B depicts an embodiment of the present disclosure, wherein a bushing member 300 can be engaged within a drill jig apparatus 312. In one embodiment, the apparatus 312 can include one or more dowel openings 314. The apparatus 312 can be configured to receive and engage the bushing mem- ber 300. For example, the apparatus 312 can include a pin 310 configured to engage a notch 308 of the bushing member 308, and a cavity 306 of the bushing can receive, e.g., a drill bit. As the drill bit spins within the cavity 306, the engagement of the notch 308 of the bushing member 300 with the pin 310 can prevent undesirable rotational move- ment of the bushing member 300 within the dowel opening 314. In another embodiment, the apparatus 312 can include a bolt hole (jig bolt hole) 316 that can be used to removably couple the apparatus 312 to an engine or car bed.

Figure 4A:
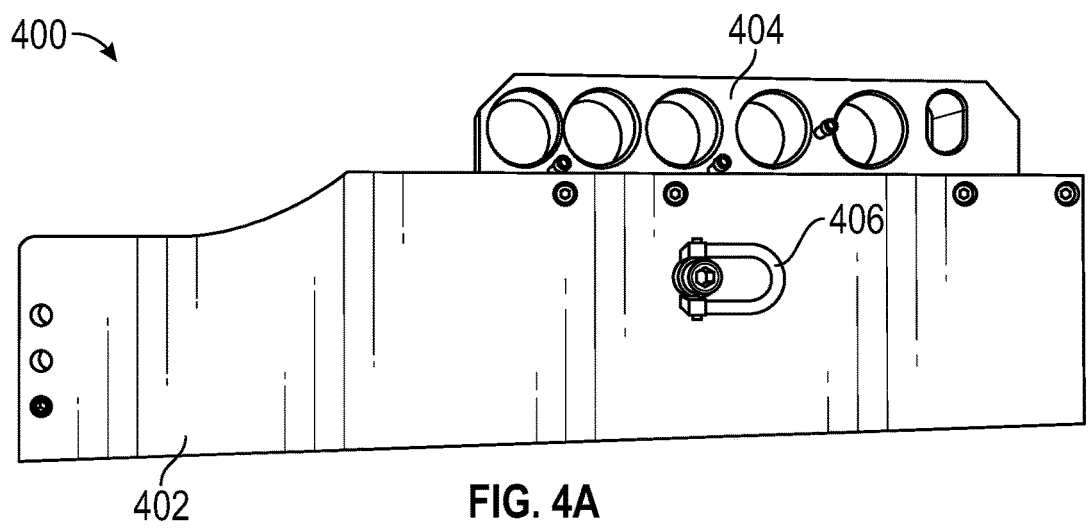
FIG. 4A illustrates a jig apparatus with a lifting eye coupled thereto, in accordance with one or more exemplary embodiments of the present disclosure.
Figure 4B:
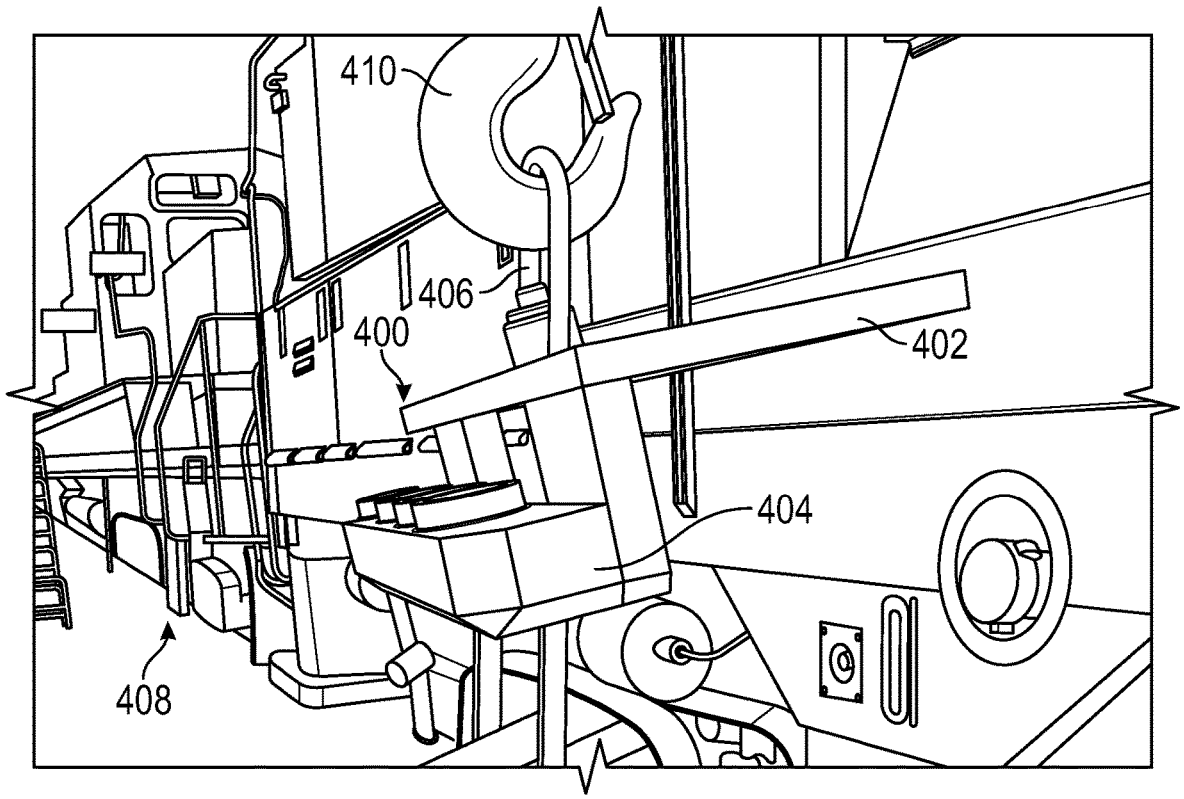
FIG. 4B illustrates a jig apparatus being lifting onto a locomotive via the lifting eye, in accordance with one or more exemplary embodiments of the present disclosure.

FIGS. 4A-4B illustrate an embodiment of the present disclosure. A jig apparatus 400 can include a first member 402 and a second member 404; the apparatus 400 can be similar to the apparatus 100, 200 in FIGS. 1A-1D and 2A-2D. In one embodiment, a jig apparatus 400 can receive a lifting eye 406, such as to facilitate hoisting of the apparatus 400. In one embodiment, the first member 402 can include a lifting eye hole (such as lifting eye hole 112 or 212 discussed previously). In another embodiment, the first member can include a bolt hole that can be operable to receive a lifting eye 406. For example, a bolt hole can have threads that correspond to threads of a lifting eye 406, such that the lifting eye can be engaged with the first member 402 of the apparatus 400. In another embodiment, the lifting eye 406 can be coupled with the apparatus 400 via any suitable method, including a quick connect, magnet, hook, or any other mechanism suitable to facilitate the attachment of the lifting eye 406 to the apparatus 400 to enable the apparatus 400 to be lifted. In one embodiment, the apparatus 400 can be hoisted by, for example, lifting hook 410 or hoisting hook 410 such as can be mechanically or manually operated to lift and lower the hook 410. In another embodiment, the lifting eye 406 can facilitate lifting of the apparatus 400 by the hook 410 such that the apparatus 400 can be coupled to a locomotive (train) (rail car) 408.

Figure 5A:
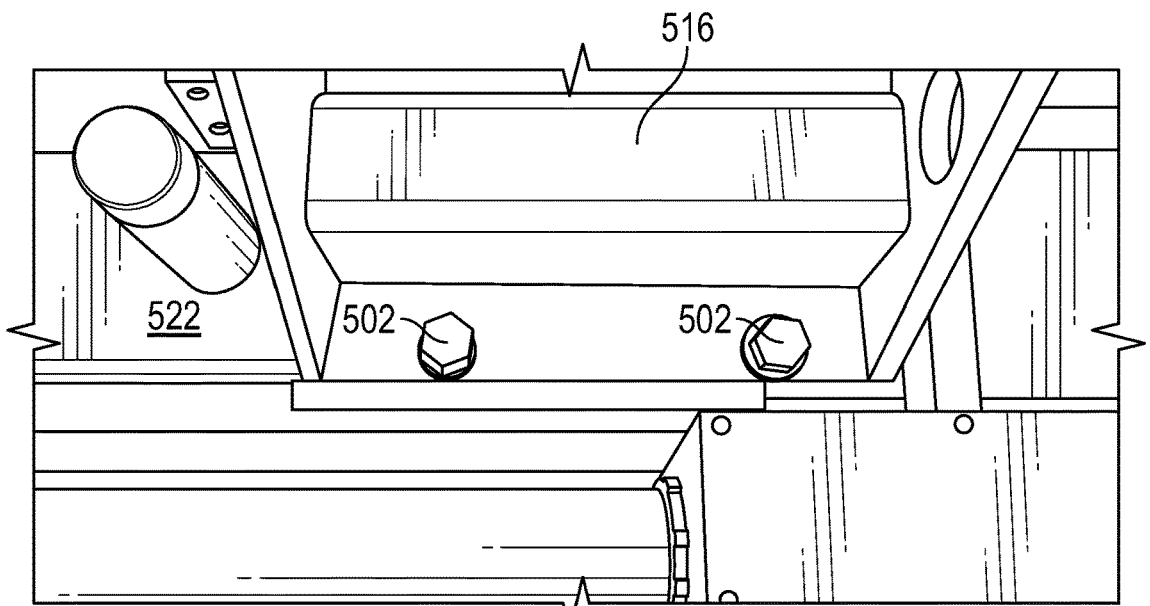
FIG. 5A illustrates method of fabricating dowel holes in an engine that can be mounted to a bedplate with engine mounting bolts, in accordance with one or more exemplary embodiments of the present disclosure.
Figure 5B:
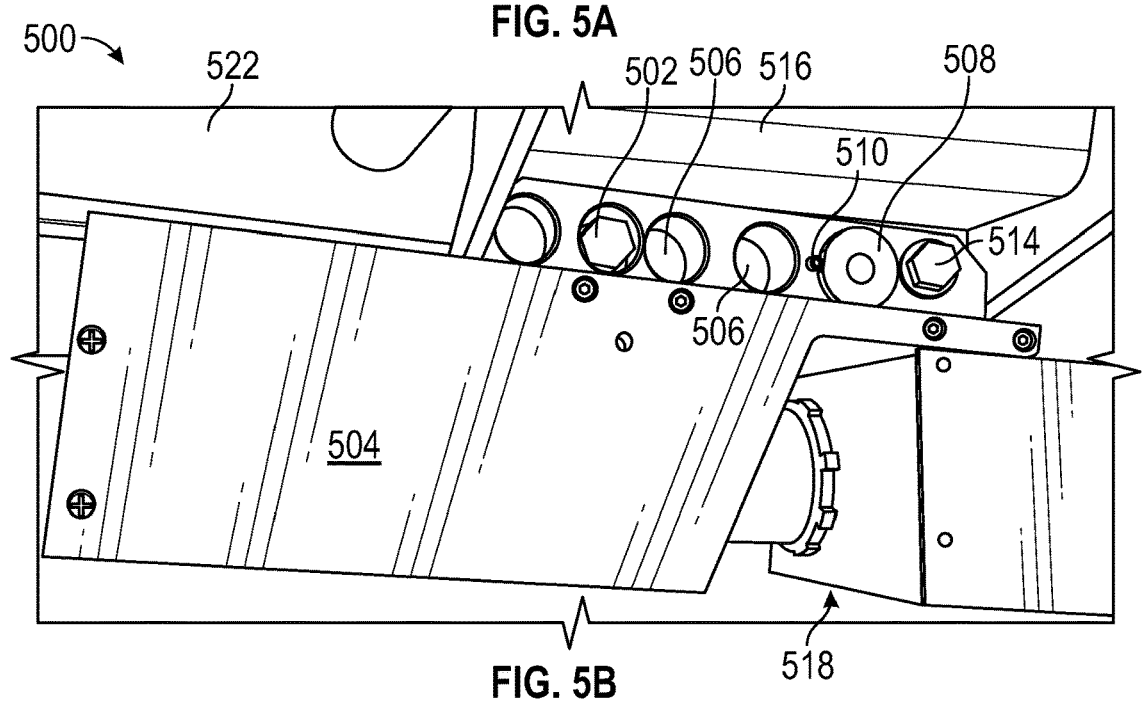
FIG. 5B illustrates a drilling system that can be coupled to an engine over an engine mounting bolt and train component, in accordance with one or more exemplary embodiments of the present disclosure.
Figure 5C:
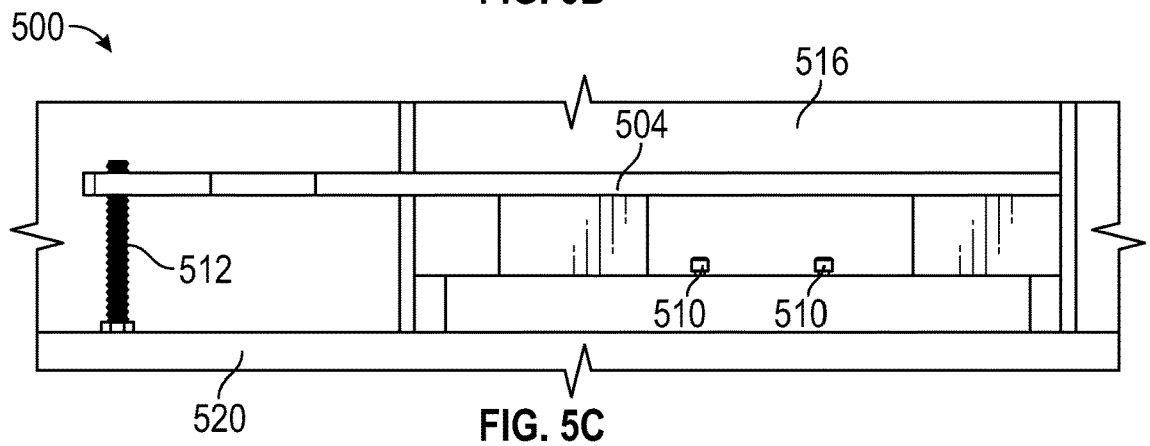
FIG. 5C illustrates a dowel hole drilling system that can be stabilized against a surface via a jacking bolt, in accordance with one or more exemplary embodiments of the present disclosure.

FIGS. 5A-5C depict a method of fabricating holes in a rail car. In one embodiment, a locomotive engine 516 can be attached to bedplate 522 with engine mounting bolts 502. In one embodiment, engine 516 (e.g., attached the bedplate 522) can have no dowels or dowel holes, and new holes can be drilled using the present method; in another embodiment, one or more dowels can be in place, securing the engine 516 to the bedplate 522 or car base 522, and the method can facilitate the formation of new dowel holes around the existing dowel holes. In one embodiment, the method can include the coupling of an engine dowel drilling system 500 to the engine 516. For example, the drilling system 500 can be similar to the jigs discussed herein (e.g., apparatus 100, 200, 400, etc.); in one embodiment, the drilling system 500 can be configured to engage a conductor side or an engineer side of an engine 516. For example, the jig 504 and system 500 can be configured to overlay a locomotive component (train component) 518 found on either a conductor side or engineer side of the engine 516 or rail car. A train component 518 can include, but is not limited to, an air intake, a motor blower, piping, wiring, rectifier, inverter, battery, fuel tank, gear, pinion, electronic controls, sand box, air reservoirs, radiator, radiator fan, gear box, air compressor, safety rail, coupler head, horn, water tank, footboard, doors, wheels, condenser, or any other component found on an exterior or interior of a train. In one example, the component 518 can be piping 518.

In another embodiment, the jig 504 can provide a platform to which a mag drill can attach while drilling, supporting the drill over a component 518. In one embodiment, FIGS. 5A-5C can be considered to depict an engineer side jig 504 or engineer side drilling system 500. The system 500 can include a drill jig member (drill jig) 504 and a bushing (bushing member) 508. In another embodiment, one engine mounting bolt 502 can be removed from the engine 516 such that the threaded hole in which the bolt 502 was engaged can be exposed. In one embodiment, the exposed hole can align with the drilling system 500, such as with a jig bolt hole of the jig 504 (e.g., jig bolt hole 110 or 210). In one example, this alignment can facilitate the coupling of the system 500 with the engine 516, such as via a jig bolt 514 or an engine mounting bolt 502; in another embodiment, the engine mounting bolt 502 can be re-inserted through the jig bolt hole of the system 500 and tightened, such that the system 500 can be coupled to the plate 516 or locomotive.

In another embodiment, the system 500 or method can include a jig 504 that includes one or more openings 506. For example, the openings 506 can be configured to receive a bushing 508, which can be similar to bushing 120, 220, or 300 discussed above. In one embodiment, the jig 504 of the system 500 can further include a bushing pin 510 configured to operably couple the bushing 508. In another embodiment, one or more of the openings 506 can be configured to circumscribe an engine mounting bolt 502 such that the bolt 502 can remain securing the engine 516 to the bedplate 522 while a dowel hole is drilled utilizing the system 500. In this manner, the engine attached to the engine 516 can remain secured in place by at least one engine mounting bolt 502, such as to prevent misalignment of engine 516 components with the locomotive or bedplate 522 while a hole is being drilled. In another embodiment, a drilling area within at least one opening can be identified. For example, a hole can be drilled in an opening 506 where there is no hole in the engine base aligning with the jig opening, such that a hole can be drilled in the engine base via the jig opening. In another embodiment, the system 500 can include a jacking bolt 512 configured to stabilize the system as it is attached to the engine 516. For example, the jacking bolt 512 can be operably coupled to the system 500 in a manner that allows the jacking bolt 512 to travel both vertically and horizontally (e.g., jacking bolt 114 and 214 in FIGS. 1A-1D and 2A-2D). In one embodiment, the jacking bolt 512 can include threads that allow the bolt 512 to travel vertically within the jig 504 of the system 500, such that the jacking bolt 512 can be extended or retracted to adapt to a surface 520 disposed below the system 500. In another embodiment, the jig 504 can include multiple holes with which the jacking bolt 512 can couple, such that the bolt 512 can be moved within a horizontal plane or line to further facilitate adaptation to the surface 520 below the system 500. Preferably, the jig 504 can include five openings 506. In one embodiment, five openings 506 can provide four separate locations for new dowel holes. For example, one of the openings 506 can receive an engine mounting bolt 502, and the other four openings 506 can be located proximate either of the engine mounting bolts 502 or jig bolt 514 such that the drilling of a dowel hole can be facilitated at those locations.

Figure 6:
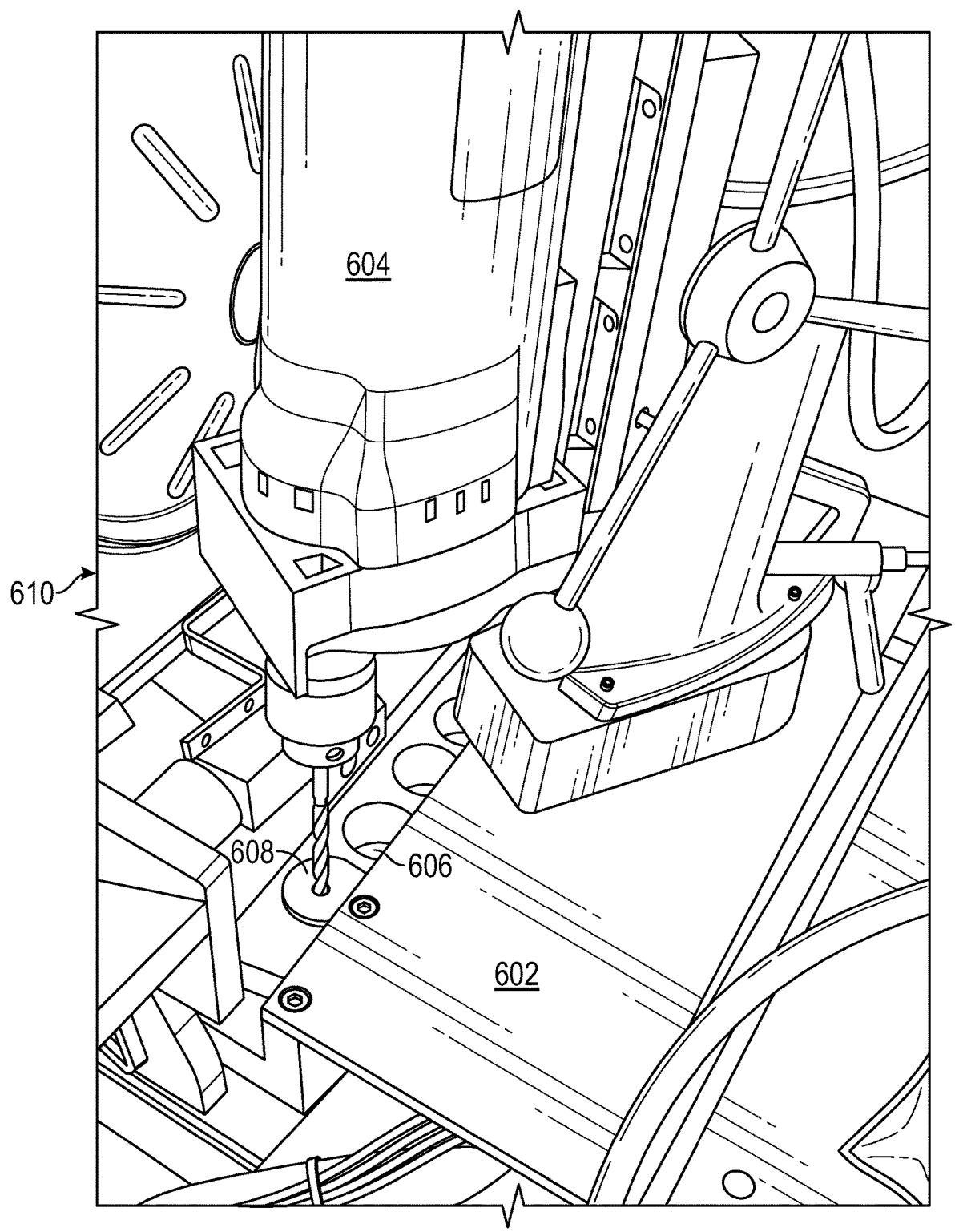
FIG. 6 illustrates a dowel hole drilling system that can facilitate the drilling of a dowel hole, in accordance with one or more exemplary embodiments of the present disclosure.

FIG. 6 illustrates an embodiment of the present disclosure, wherein a dowel hole drilling system 600 can facilitate the fabrication of holes in a locomotive 610, such as dowel holes in an engine plate and/or car bed. In one embodiment, the system 600 can include a drill jig 602 configured to operably couple the locomotive 610 or other rail car. For example, the jig 602 can include a jig bolt hole like those discussed herein that is operable align with an engine mounting bolt hole and receive a jig bolt or engine mounting bolt. In another embodiment, the jig 602 can be configured to operably couple to a conductor or engineer side of the locomotive 610. For example, the jig 602 can be configured to operably couple to an engine and/or a bedplate and extend over components of the locomotive 610, such that a drill 604 can rest on the jig 602 to facilitate drilling into the locomotive 610. In another embodiment, the jig 602 can be configured to operably couple to a drill 604; for example, the jig 602 can include a platform on which a drill 604 can rest, and the platform can be a metal or other magnetically-active material such that a mag drill 604 (like those known in the art) can magnetically attach thereto. In another example, the jig 602 can include holes that can align with holes on the drill 604 such that a drill 604 can be attached to the jig 602, such as with screws or bolts. In another embodiment, the jig 602 can provide an area on which a drill 604 can clamp. In another embodiment, the jig 602 or system 600 can include any suitable attachment mechanism or design operable to secure and/or stabilize a drill while a hole is drilled in a locomotive 610. In one embodiment, the system 600 can include a jig 602 and a bushing 608 that can be configured to operably couple to a dowel opening 606 of the jig 602.

In another embodiment, the system 600 can provide a plurality of areas 606 or openings 606 in which dowel holes can be fabricated. For example, any one of the available dowel openings 606 can receive the bushing 608 (or a bushing similar to bushing 608) to facilitate the drilling of a dowel hole therein. In another embodiment, any one of the dowel openings 606 can be configured to overlay and circumscribe a head of an engine mounting bolt, and the unoccupied dowel openings 606 can then be fitted with a bushing 608 and facilitate the drilling of a dowel hole. In this manner, the system 600 can provide multiple points at which drilling can be enabled with the system 600 while the engine remains secured via one or more engine mounting bolts.

Figure 7:
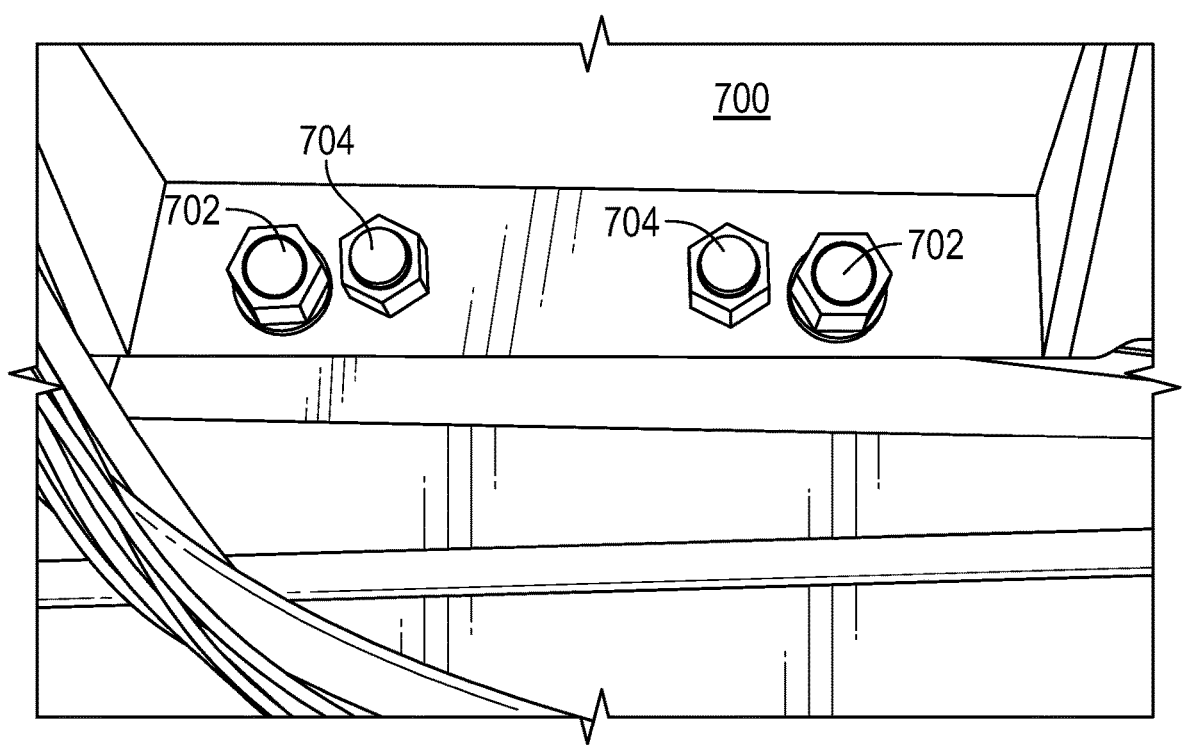
FIG. 7 illustrates an engine that can be coupled to a locomotive bedplate of a train with engine mounting bolts and dowels, in accordance with one or more exemplary embodiments of the present disclosure.

FIG. 7 depicts an engine 700 mounted to a bedplate via engine mounting bolts 702, and further secured to the car base with one or more dowels 704. In one embodiment, the dowels 704 can be inserted after fabrication of dowel holes in accordance with the principles of the present disclosure. In another embodiment, an engine 700 in need of replacement dowels can have the engine mounting bolts 702 and dowels 704 securing it to a bedplate and/or car base or car bed. For example, if new dowels are needed, the old dowels 704 can be removed, as well as one of the engine mounting bolts 702. In one embodiment, a jig apparatus or system like those discussed herein can be coupled to the engine 700 and/or bedplate and/or car base via, for example, a jig bolt inserted through a hole in the jig and engaged with the vacant hole of the removed engine mounting bolt 702. In another embodiment, the jig can be configured to attach to the engine 700 while one or both of the engine mounting bolts 702 (and/or one or more of the dowels 704) remain secured in place. For example, as such as discussed with respect to FIG. 6, the dowel openings of the jig can circumscribe the engine mounting bolt 702 or bolts 702 and/or the dowel 704 or dowels 704 while maintain one or more openings in which a bushing can be inserted to enable a hole to be drilled.

Figure 8:
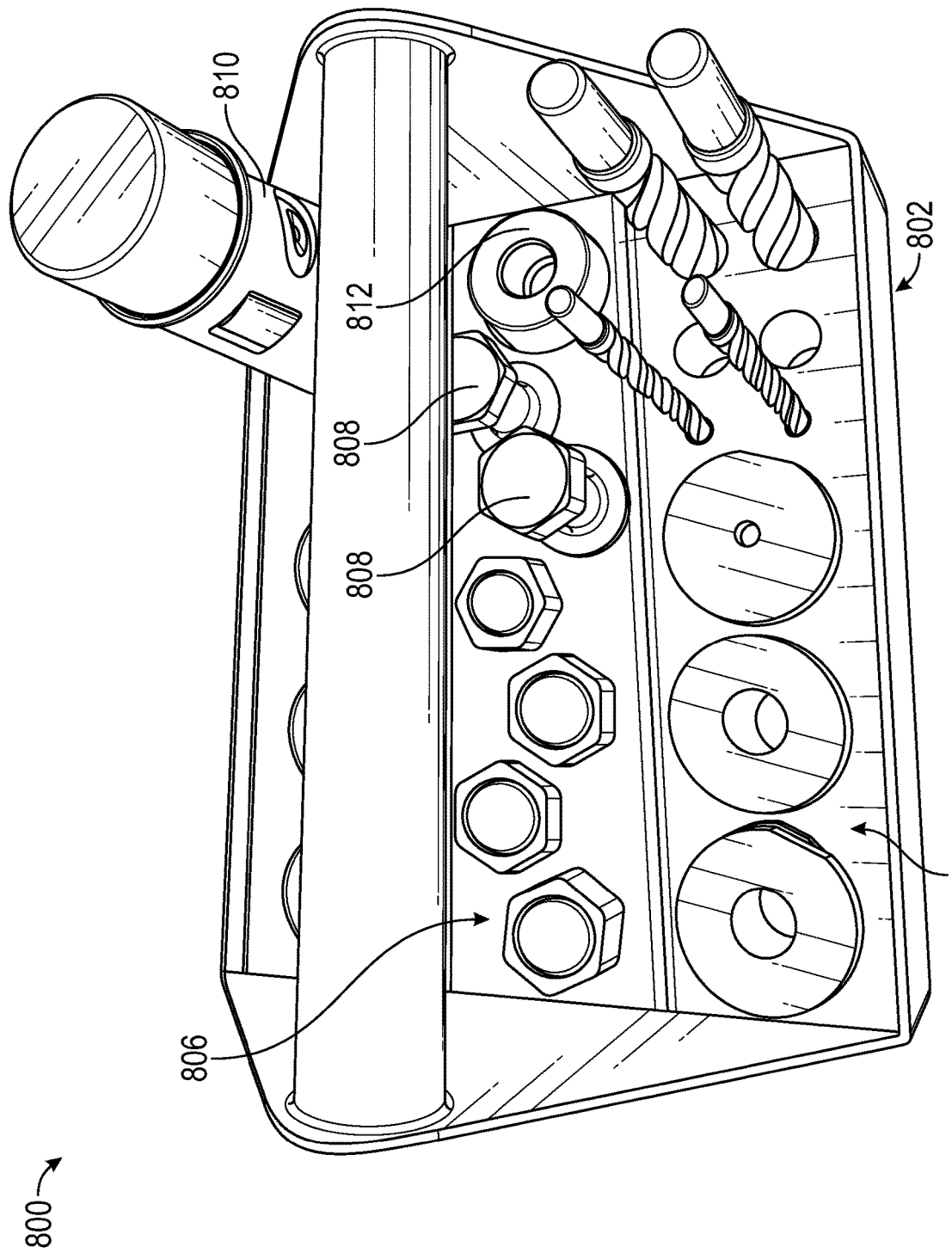
FIG. 8 illustrates a dowel hole drilling kit, in accordance with one or more exemplary embodiments of the present disclosure.

FIG. 8 depicts another embodiment of the present disclosure. A dowel hole drilling kit 800 can include one or more drill bits 802, one or more bushings 804, one or more dowels 806, one or more jig bolts 808, drill lubricant 810, a magnet 812, and one or more drill jigs (e.g. jig 100 and jig 200). In one embodiment, the drill bits 802 can be of varying sizes, or any size suitable to drill dowel holes in a rail car or locomotive. In another embodiment, the bushings 804 can each correspond to a different drill bit 802. In another embodiment, the kit 800 can include standardized dowels 806 configured to operably couple holes drilled using the bits 802 and bushings 804. In one embodiment, the jig bolt(s) 808 can be configured to engage with a jig and locomotive, such as jig 100 or 200 as seen in FIGS. 1A-1D and FIGS. 2A-2D, respectively, in accordance with the principles of the present disclosure. Preferably, the kit 800 can include six bushings 804 in three sizes (two of each size), six drill bits 806 in three sizes (two of each size), four dowels 806, two jig bolts 808, two magnets 812, two containers of lubricant 810, and two jigs, one for a conductor side and one for an engineer side. In this manner, the kit 800 can facilitate the drilling of dowel holes on both the conductor and engineer side of a locomotive, even simultaneously. For example, one crew, using the engineer-side jig, can take three bushings 804, three bits 802, one jig bolt 808, one lubricant 810, one magnet 812, and two dowels 806 from the kit 800 and be prepared to install dowels on the engineer side of the locomotive.

In another example, a first drill bit 802 can be used as a pilot bit, a second drill bit 802 can be used widen the pilot hole, and the third bit 802 can be used to ream the hole; in one embodiment, each bit 802 can have a corresponding bushing 804, and each bushing 804 can be operably coupled to either jig. In another embodiment, the dowels 806 can be used interchangeably between any holes created using the kit 800, because the kit 800 can, for example, standardize the dowel hole fabrication process. In another embodiment, the magnet 812 can be used to collect metal shavings created during drilling, and the lubricant 810 can be used to lubricate any or all of the drill bits 802 during drilling. In another embodiment, any suitable number of constituents can be included in the kit 800 to enable the drilling of dowel holes on the engineer and/or conductor side of a locomotive.

In one embodiment, the drill bits 802 can be $\frac{3}{8}$-inch ($\frac{3}{8}$" 2). $\frac{7}{8}$-inch ($\frac{7}{8}$" 2), and $\frac{15}{16}$-inch ($\frac{15}{16}$" 4) drill bits. In another embodiment, the drill bits 802 can include a $\frac{3}{8}$" 2 flute parabolic drill bit, a $\frac{7}{8}$" 2 flute bit, and a $\frac{15}{16}$" 4 flute drill 8.5" OAL drill bit; in another embodiment, the bushings 804 can be configured to correspond to these drill bits 802. In another embodiment, the dowels 806 can be 0.940-inch (0.940") dowels 806; in another embodiment, the dowels 806 can includes nuts or heads. In another embodiment, the kit 800 can include a drill, such as a mag drill known in the art; in another embodiment, the kit 800 can include one or more washers. For example, the kit 800 can include hardened steel washers, $1\frac{1}{32}$-inch ($1\frac{1}{32}$") inner-diameter (ID) and 2-inch (2") outer-diameter (OD); in another example, the kit 800 can include four of these washers, or one washer for each dowel 806. In another embodiment, the kit 800 can include an air hammer (to, e.g., drive the dowel 806), a telescoping gauge (snap gauge) (to, e.g., measure internal diameter of the hole), 1-inch (1") micrometer (to measure, e.g., the dowel size), a lifting eye that can couple with one or both of the engineer- and conductor-side jigs, and/or a $1\frac{1}{2}$-inch ($1\frac{1}{2}$") $\frac{3}{4}$-inch ($\frac{3}{4}$") drive six (6) point socket (to, e.g., facilitate removal and/or reinstallation of an engine mounting bolt and/or jig bolt).

In one embodiment, the drill jigs and drilling systems disclosed herein can facilitate the standardization of dowel holes in locomotive engines. For example, the conductor-side jig and engineer-side jig can each be standardized for one or more types of locomotive engines (such as EMD engines), such that the jig bolt hole can be operable to enable coupling of the jig to a given engine via an engine mounting bolt hole. In another example, dowel openings and bushings can be of standard sizes to accommodate standard drill bits. For example, bushings with different sized drill cavities can be operably coupled the jig, such that holes of different sizes can be drilled using the same jig by simply changing the bushing. In another embodiment, the second member can be configured (such as via the chamfers) to be operably coupled to an engine on either the conductor or engineer side. In one embodiment, the first member can be located a pre-determined distance above a second member such that the first member can overlay a component on an engineer or conductor side of a locomotive engine while the second member is coupled to the engine. In another embodiment, the first member can be configured to accommodate components commonly found on either the engineer or locomotive side, such as by including a cut, notch, or indention in the first member that a locomotive component can protrude through or around.

In one example, the jig apparatuses and systems can increase safety in drilling dowel holes by providing an area on which a drill can rest or attach for stability during drilling; such stabilizing can be accomplished via the coupling of the jig to the engine (e.g., via a jig bolt) and/or, e.g., adjusting a jacking bolt to contact a surface. In one example, an engineer-side jig and conductor-side jig can be considered like left and right hands, such that they can be substantially mirror images of one another while not being super-imposable on one another.

In another embodiment, the methods, systems, and apparatuses discussed herein can be utilized to create or fabricate holes in any given rail car. For example, a jig can be operably coupled to a specific area on a train that requires drilled holes, such that the jig can be used to make uniform holes at the same location on multiple engines or locomotive car bodies. In another embodiment, the jigs described herein can be made of steel or any other material suitable to enable the jig to facilitate drilling of holes in a rail car or locomotive. Bushings and/or bushing pins described herein can similarly made of steel or any other material suitable to enable drilling in a rail car or locomotive. Preferably, the bushings described herein (and the corresponding openings or dowel openings) can be configured to accommodate at least a ⅜-inch (⅜" 2), ⅞-inch (⅞" 2), and 15/16-inch (15/16" 4) drill bits, as well as any other size drill bit; in another embodiment, the bushings can accommodate flute parabolic drill bits, flute drill bits, finishing bits, or any other types of drill bits. In another embodiment, different bushings can be used for different sized drill bits, and each different bushing can be operably coupled to the same jig.

The present disclosure achieves at least the following advantages:

1. Standardizing dowel holes and dowels for engine attachment;
2. Increasing the safety of drilling dowel holes;
3. Providing a drill jig that enables both the standardization of the dowel placement and drill attachment;
4. Preventing bushing movement by providing a jig that can be operably coupled a bushing;
5. Providing a jig that can include multiple removably-attached members, such that damaged members can be replaced with new members without requiring replacement of the entire jig;
6. Enabling the fabrication of dowel holes in an engine while maintaining alignment of the engine (such as via an engine mounting bolt that a jig can be coupled over);
7. Providing, via a jig, multiple locations in which a dowel hole can be drilled;
8. Facilitating the lifting and placement of a jig by enabling the attachment of a lifting eye;
9. Increasing the efficiency of dowel hole drilling by standardizing the method, procedure, and requirement components; and
10. Eliminating the need to weld existing dowel holes prior to dowel replacement by providing multiple locations at which new dowel holes can be drilled.

Persons skilled in the art will readily understand that these advantages (as well as the advantages indicated in the summary) and the objectives of this system would not be possible without the particular combination of hardware and other structural components and mechanisms assembled in this inventive system and described herein. It will be further understood that a variety of tools other than those disclosed, known to persons skilled in the art, may be available for assisting in the implementing of the features and operations described in the foregoing material. Moreover, the particular choice of tool(s) may be governed by the specific objectives and constraints placed on the implementation selected for realizing the concepts set forth herein and in the appended claims.

The description in this patent document should not be read as implying that any particular element, step, or function can be an essential or critical element that must be included in the claim scope. Also, none of the claims can be intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim can be understood and intended to refer to structures known to those skilled in the relevant art, as further modified or enhanced by the features of the claims themselves, and can be not intended to invoke 35 U.S.C. § 112(f).

The disclosure may be embodied in other specific forms without departing from the spirit or essential characteristics thereof. For example, each of the new structures described herein, may be modified to suit particular local variations or requirements while retaining their basic configurations or structural relationships with each other or while performing the same or similar functions described herein. The present embodiments are therefore to be considered in all respects as illustrative and not restrictive. Accordingly, the scope of the inventions can be established by the appended claims rather than by the foregoing description. All changes which come within the meaning and range of equivalency of the claims are therefore intended to be embraced therein. Further, the individual elements of the claims are not well-understood, routine, or conventional. Instead, the claims are directed to the unconventional inventive concept described in the specification.

What is claimed is:

1. A drill jig apparatus for a train, the apparatus including:
   a first member plate disposed along a first horizontal plane and having a top surface and a bottom surface, the first member plate having a length along a longitudinal axis of the first member plate and a width along a cross axis of the first member plate, the length of the first member plate greater than the width of the first member plate, the first member plate including a jacking bolt hole threaded to receive a jacking bolt from the bottom surface of the first member plate to stabilize the first member plate against a surface, the first member plate configured to facilitate placement of a drill thereon, wherein the jacking bolt hole is disposed to receive the jacking bolt along a longitudinal axis of the jacking bolt that is perpendicular to the longitudinal axis of the first member plate;
   a second member having an indentation or chamfer to accommodate at least a portion of a train component, wherein a longitudinal axis of the second member and the longitudinal axis of the first member plate do not intersect a same horizontal plane, the second member including:
   a first opening configured to receive a bushing; and
   a jig bolt hole configured to receive a jig bolt; and
   a third member coupled to the first and second members.

2. The apparatus of claim 1, wherein the apparatus is operably coupled to a conductor side of a locomotive.

3. The apparatus of claim 1, wherein the apparatus is operably coupled to an engineer side of a locomotive.

4. The apparatus of claim 1, wherein the jacking bolt is operable to vertically adjust within the first member plate.

5. The apparatus of claim 1, wherein the second member further includes a bushing pin.

6. The apparatus of claim 1, wherein the second member is disposed below the first member plate.

7. The apparatus of claim 1, wherein the second member includes a second opening.

8. The apparatus of claim 1, wherein the first member plate is operably coupled to a drill.

9. The apparatus of claim 1, further including a lifting eye.

10. A train engine dowel drilling system, the system including:

a drill jig member including:
- a first member plate disposed along a first horizontal plane and having a top surface and a bottom surface, the first member plate having a length along a longitudinal axis of the first member plate and a width along a cross axis of the first member plate, the length of the first member plate greater than the width of the first member plate, the first member plate including a jacking bolt hole threaded to receive from the bottom surface of the first member plate a jacking bolt configured to stabilize the first member plate against a surface, the first member plate configured to facilitate placement of a drill thereon, wherein the jacking bolt hole is disposed to receive the jacking bolt along a longitudinal axis of the jacking bolt that is perpendicular to the longitudinal axis of the first member plate;
- a second member having an indentation or chamfer to accommodate at least a portion of a train component, wherein a longitudinal axis of the second member and the longitudinal axis of the first member plate do not intersect a same horizontal plane, the second member including:
  - at least one dowel opening; and
  - at least one jig bolt opening; and
- a bushing member, wherein the second member is operably coupled to the bushing member.

11. The system of claim 10, wherein the drill jig member is configured to couple to an engine over an engine mounting bolt.

12. The system of claim 10, wherein the drill jig member is configured to couple to a drill.

13. The system of claim 10, wherein the drill jig member further includes a bushing pin.

14. The system of claim 10, wherein the first member plate is removably coupled to the second member.

15. The system of claim 10, wherein the drill jig member further includes a third member coupled to the first and second members.

16. The system of claim 10, wherein the drill jig member is operably coupled to an engineer side or a conductor side of an engine.

* * * * *